United States Patent
Coughlan et al.

(10) Patent No.: US 8,675,829 B1
(45) Date of Patent: Mar. 18, 2014

(54) NOTIFY CALLER IF LOW QUALITY VOICEMAIL IS BEING RECORDED

(75) Inventors: Marc Coughlan, Balmain (AU); Alexander Forbes, Westleigh (AU); Ciaran Gannon, Sydney (AU); Peter D. Runcie, Bilgola Plateau (AU); Ralph Warta, Gladesville (AU)

(73) Assignee: Avaya Inc., Basking Ridge, NJ (US)

( * ) Notice: Subject to any disclaimer, the term of this patent is extended or adjusted under 35 U.S.C. 154(b) by 1667 days.

(21) Appl. No.: 11/857,971

(22) Filed: Sep. 19, 2007

(51) Int. Cl.
*H04M 1/64* (2006.01)

(52) U.S. Cl.
USPC ..................... 379/88.08; 379/88.22

(58) Field of Classification Search
USPC .................................. 379/1.02, 88
See application file for complete search history.

(56) References Cited

U.S. PATENT DOCUMENTS

| | | | | |
|---|---|---|---|---|
| 5,524,279 A * | 6/1996 | Keba et al. | ............... | 455/504 |
| 5,613,218 A * | 3/1997 | Li et al. | ............... | 455/71 |
| 5,802,149 A * | 9/1998 | Hanson | ............... | 379/88.03 |
| 6,222,892 B1 * | 4/2001 | Taki et al. | ............... | 375/354 |
| 6,691,167 B2 * | 2/2004 | Procopio et al. | ............... | 709/235 |
| 6,952,406 B2 * | 10/2005 | Procopio | ............... | 370/252 |
| 7,149,501 B2 * | 12/2006 | Haumont et al. | ............... | 455/413 |
| 7,283,785 B2 * | 10/2007 | Benco et al. | ............... | 455/3.06 |
| 7,483,520 B2 * | 1/2009 | Han et al. | ............... | 379/88.03 |
| 8,331,540 B2 * | 12/2012 | Shaffer et al. | ............... | 379/88.18 |
| 2004/0228456 A1 * | 11/2004 | Glynn et al. | ............... | 379/88.01 |
| 2005/0243975 A1 * | 11/2005 | Reich et al. | ............... | 379/88.01 |
| 2008/0165935 A1 * | 7/2008 | Shaffer et al. | ............... | 379/1.02 |

* cited by examiner

*Primary Examiner* — Joseph T Phan
(74) *Attorney, Agent, or Firm* — Sheridan Ross P.C.

(57) ABSTRACT

The present invention provides methods, devices, and systems for notifying a caller that they are leaving a low quality voice mail. The user can be notified that they are leaving such a voicemail before they are done leaving the message. This allows the user to try and leave another voicemail having a better quality, thereby making the voicemail more comprehensible.

22 Claims, 3 Drawing Sheets

NOTIFY CALLER IF LOW QUALITY VOICEMAIL IS BEING RECORDED

FIELD OF THE INVENTION

The invention relates generally to communication systems and more particularly to voice messaging systems.

BACKGROUND

Voicemail systems allow a caller to leave a recorded voice message for a called party when the called party is unwilling or unavailable to take the call. Whether the voicemail system is deployed with a private branch exchange (PBX) switch or with a voicemail server, a mailbox is typically assigned for each user, or user agent client device (e.g., phone, PDA, portable email retrieval device, mobile phone, personal computer, laptop, application specific devices, etc.) associated with a user, in the communication system. The voicemail system is much like an answering machine on a client device but with important advantages. One advantage of a voicemail system is that users no longer need to spend money on answering machine tapes, which tend to wear out after extended use. One problem with voicemail systems and answering machines alike is that a caller leaving the voice message may leave a low quality message either because the tape has worn out or because of other factors such as background noise, bad connections, and so on. Often times the caller is unaware that they have left a low quality message and further unaware that the recipient of the message may not be able to understand the message due to its low quality.

There have been some solutions to this particular problem. For instance, systems have been developed that allow a caller to review an entire message after it has been recorded. This allows the caller to ensure that a high quality, or at least an understandable, message has been left for the recipient. One problem with this particular solution, however, is that the caller has to wait until the entire message has been left before they can review the quality of the message. This is particularly cumbersome when the caller leaves a long message only to find out that some or the entire message was of low quality at which point the caller has to leave the entire message again for the recipient.

Another solution that exists is described in U.S. Pat. No. 6,219,638, the entire contents of which are hereby incorporated herein by this reference. The '638 patent describes a system that allows a caller leaving a voicemail to listen to or view a text transcription of the voicemail. This allows the user to review the message text for errors and edit any problems that occurred in the voice-to-text conversion due to message quality issues. Again, this solution has the drawback that the caller has to wait until the entire message is left before they can review it for quality.

There are also some systems that inform participants of a conference call that their voice/video quality is below a particular standard. Such systems are useful in that they allow the participants to determine that the conference quality is substandard and further allow the participants to transfer conferencing equipment if necessary. This is somewhat redundant in the conference call technology because the other participants usually serve as an immediate quality checkpoint for the other participants. More specifically, if one participant cannot understand what another participant has said, that participant will likely ask the speaking participant to repeat what they said. Such systems have not yet been extended to voicemail applications where there is no human participant on the receiving end of the message when it is being sent.

Accordingly, it would be desirable to provide a voicemail system that helps a caller ensure that they are leaving a high quality voicemail instead of waiting until the caller has left the entire message before a quality review is performed.

SUMMARY

These and other needs are addressed by various embodiments and configurations of the present invention. The present invention is directed generally to a system, device, and method for notifying a caller if they are leaving a low quality voicemail. The method generally comprises:

receiving at least a portion of a voice and/or video message from a calling party;

while the calling party is providing the voice and/or video message, analyzing the message for quality issues;

detecting at least one quality issue associated with the message; and notifying the calling party that a low quality message is being recorded.

By notifying the calling party that the message being recorded is a low quality message, the calling party can stop leaving the low quality message, attempt to rectify the possible source leading to the low quality message, and begin leaving a new message for the intended recipient. Additionally, a calling party does not have to wait until they are done leaving the message to screen the message for quality issues. Rather, the near real-time analysis of the message allows the detection of quality issues before the message is complete. This helps reduce the amount of time required to record a high quality message, especially if the message is of a non-trivial length.

In accordance with at least one embodiment of the present invention, the calling party may also be provided with guesses or speculations regarding the possible source of the quality problem. This way the user can determine the best course of action to leave a high quality voicemail. For example, the user may decide that the source of the problem is beyond their control and therefore should just leave the message as it is. Alternatively, the user may decide to call back at a later time in the hopes that the source of the quality problem has been fixed.

One inventive aspect of the present invention is that the receiving, analyzing, detecting, and notifying steps can be performed during a synchronous messaging session. A synchronous messaging session corresponds to any type of concurrent messaging interaction between endpoints where the message is sent concurrently as it is received by the user such as voice messaging, video messaging, and the like as opposed to asynchronous messaging sessions such as, for example, e-mail, chat, web access, other text based media sessions, etc, where the message transmission is delayed until the entire message is received.

As used herein, a "message" may include a voice and/or video message. The entirety of the voice message may be analyzed for quality issues while the voice portion of the video message may be analyzed for quality issues. The ability to monitor the quality of both kinds of messages is particularly useful in instances where the message contains important information and the calling party wants to assure that at least the voice portion of the message is comprehendible.

In accordance with at least some embodiments of the present invention, a communication device is provided. The device generally comprises memory for storing a message left by a calling party and a message quality inspection module operable to analyze the message as it is being stored in memory for quality and notify the calling party that the message being recorded comprises a low quality. The memory may be in the form of tape memory, a disk drive, or any similar type of data storage medium.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity.

As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic even if performance of the process or operation uses human input, whether material or immaterial, received before performance of the process or operation. Human input is deemed to be material if such input influences how the process or operation will be performed. Human input that consents to the performance of the process or operation is not deemed to be "material".

The term "computer-readable medium" as used herein refers to any tangible storage and/or transmission medium that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the invention is considered to include a tangible storage medium or distribution medium and prior art-recognized equivalents and successor media, in which the software implementations of the present invention are stored.

The terms "determine," "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

DETAILED DESCRIPTION

The invention will be illustrated below in conjunction with an exemplary communication system. Although well suited for use with, e.g., a system using a server(s) and/or database (s), the invention is not limited to use with any particular type of communication system or configuration of system elements. Those skilled in the art will recognize that the disclosed techniques may be used in any communication application in which it is desirable to ensure that high quality voicemails are left by callers.

The exemplary systems and methods of this invention will also be described in relation to communications software, modules, and associated communication hardware. However, to avoid unnecessarily obscuring the present invention, the following description omits well-known structures, network components and devices that may be shown in block diagram form, are well known, or are otherwise summarized.

For purposes of explanation, numerous details are set forth in order to provide a thorough understanding of the present invention. It should be appreciated, however, that the present invention may be practiced in a variety of ways beyond the specific details set forth herein.

Furthermore, while the exemplary embodiments illustrated herein show the various components of the system collocated, it is to be appreciated that the various components of the system can be located at distant portions of a distributed network, such as a communication network and/or the Internet, or within a dedicated secure, unsecured and/or encrypted system. Thus, it should be appreciated that the components of the system can be combined into one or more devices, such as an enterprise server, a PBX, or collocated on a particular node of a distributed network, such as an analog and/or digital communication network. As will be appreciated from the following description, and for reasons of computational efficiency, the components of the system can be arranged at any location within a distributed network without affecting the operation of the system. For example, the various components can be located in a local server, at one or more users' premises, or some combination thereof. Similarly, one or more functional portions of the system could be distributed between a server, gateway, PBX, and/or associated communication device.

Figure 1:
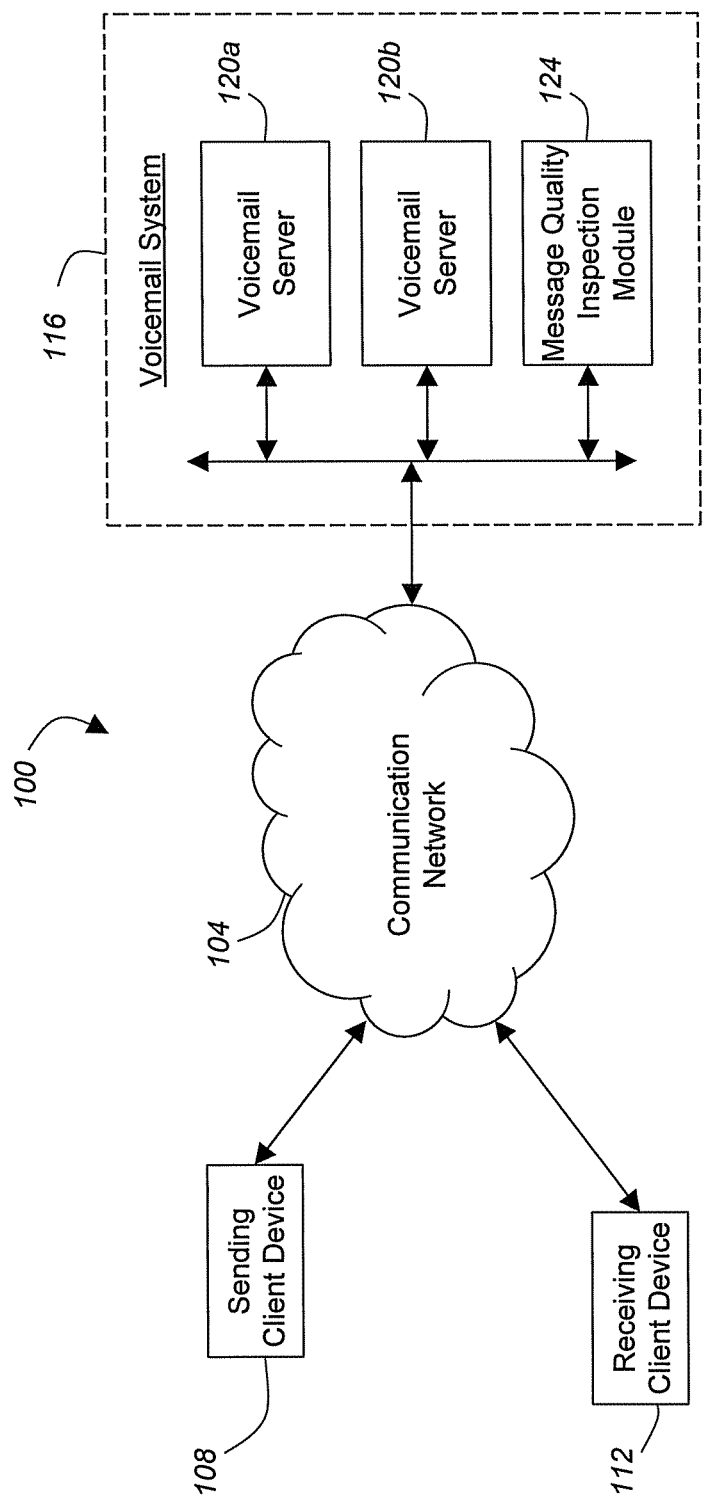
FIG. 1 is a block diagram of a communication system in accordance with embodiments of the present invention.

Referring initially to FIG. 1, a communication system 100 will be described in accordance with at least some embodiments of the present invention. The communication system 100 generally comprises a communication network 104 through which communication signals may be transmitted from a sending client device 108 to a receiving client device 112. The sending client device 108 may be associated with a first user whereas the receiving client device 112 may be associated with another user.

The communication network 104 may comprise any type of information transportation medium and may use any type of protocols to transport messages between endpoints. The communication network 104 may include wired and/or wireless communication technologies. The Internet is an example of the communication network 104 that constitutes and IP network consisting of many computers and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, and any other type of packet-switched or circuit-switched network known in the art. In addition, it can be appreciated that the communication network 104 need not be limited to any one network type, and instead may be comprised of a number of different networks and/or network types.

The client devices 108, 112 may comprise any type of IP communication device such as, for example, IP phones, Personal Digital Assistants or PDAs, Personal Computers or PCs, laptops, packet-based H.320 video phones and conferencing units, packet-based voice messaging and response units, packet-based traditional computer telephony adjuncts, conventional wired or wireless telephones, cellular phones, and any other IP device equipped with the tools to facilitate various types of communication like voice, messaging, streaming, and video. In accordance with at least some embodiments of the present invention, the client devices 108, 112 may be enabled to communicate using SIP standards.

The client devices 108, 112 may also comprise legacy communication devices that still employ the PSTN for communication. Such legacy client devices 108, 112 may also communicate with other SIP devices, such as a SIP enabled client device by utilizing known trunking techniques.

The client devices 108, 112 are generally operable to generate and transmit audio messages, video messages, and/or data messages (e.g., email, text messages, SMS messages, etc.) across the communication network 104 to other client devices 108, 112.

The sending client device 108 may attempt to contact the receiving client device 112 by placing a call to the receiving client device 112. In the event that the user associated with the receiving client device 112 (i.e., the intended recipient of the call) is unavailable either because he/she is engaged in a communication session with another user or because he/she chose not to answer the incoming call, the sending client device 108 may be redirected to a voicemail system 116 to leave a message for the intended recipient. The voicemail system 116 may comprise a voicemail server 120 and a message quality inspection module 124. The voicemail system 116 is generally located remotely with respect to either client devices 108, 112 and is usually administered by a communication network service provider. In an alternative embodiment, however, the voicemail system 116 may be co-located with respect to the receiving client device 112. For example, the voicemail system 116 may comprise a known message machine that comprises similar functionality to the voicemail server 120. The message quality inspection module 124 may be included in or attached to the message machine for monitoring the quality of messages left on the machine.

One or both of the voicemail servers 120a and 120b are used as the point in the voicemail system 116 where the sending client device 108 can leave a voice message for the intended recipient. In accordance with at least some embodiments of the present invention, a first voicemail server 120a may be provided as a primary server while a second voicemail server 120b may be provided as a backup server to take over if the first server 120a fails or otherwise becomes inoperable. Each voicemail server 120 may include an Interactive Voice Response (IVR) unit that administers messaging options to the calling party. The calling party may be provided with the option of whether they would like to have their message monitored for quality while they are leaving the message. This particular option may be useful in situations where the calling party believes the message is important and wants to assure that the message left for the intended recipient is clear and understandable. The voicemail servers 120 may also comprise memory for retaining any voice message left by the calling party for the intended recipient. In accordance with at least some embodiments of the present invention, the voicemail server 120 comprising the message may provide an indication to the receiving client device 112 that a message is waiting on the voicemail server 120 for retrieval. This message may be transmitted to the receiving client device 112 once or each time the device 112 is used. The intended recipient can then remotely access the message by connecting with the voicemail server 120 from the client device 112. The intended recipient may also connect with the voicemail server 120 from any other communication device as long as a phone number and password are known.

The message quality inspection module 124 may comprise functionality that allows it to monitor messages, server status, and network conditions as the calling party is leaving a message on a voicemail server 120. As a default setting, the message quality inspection module 124 may monitor every message for quality. However, as noted above, a calling party may be provided with the option to disengage this particular feature for a particular message or for all messages left by that particular party. Accordingly, the operation of the message quality inspection module 124 may be defined by user preferences in addition to its default settings.

In accordance with at least one embodiment of the present invention, the message quality inspection module 124 may be operable to "listen" to a voicemail message as it is being recorded and test the quality of the recording. Additionally, the message quality inspection module 124 may be adapted to analyze the voice portions of a video message for quality. One way the message quality inspection module 124 may test the quality of the message is by attempting to translate the voice portion of the message into a text message and then analyzing the text message for clear words/sentences as well as grammatical issues. If the message quality inspection module 124 can successfully convert a voice message into a text message that is understandable within a predefined threshold (e.g., less than a predetermined percentage/number of words/sentences are not recognized or greater than a predetermined percentage/number of words/sentences are recognized and have no problems), then the message quality inspection module 124 will continue to allow the calling party to leave the voice or video message in the normal fashion. However, if the predefined quality threshold is exceeded, then the message quality inspection module 124 may be operable to interrupt the calling party and notify them that the voice portion of the message they are currently leaving is of a low quality and may not be understandable by the intended recipient.

The message quality inspection module 124 may also analyze the signal-to-noise ratio of the incoming voice or video message. By analyzing the signal-to-noise ratio, the message quality inspection module 124 can determine if the message would be comprehendible by a listener based on the amount of noise present. A high signal-to-noise ratio may indicate that the message is of an acceptable quality, whereas a low signal-to-noise ratio may indicate that the message has a low quality. If the signal-to-noise ratio is below a particular threshold, then the message quality inspection module 124 may determine that either too much background noise exists or that the calling party is speaking too softly.

Another way that the message quality inspection module 124 may test the quality of the message is to measure the network 104 for packet loss or other VoIP Quality of Service (QoS) parameters. One way the message quality inspection module 124 may detect issues with network 104 QoS is by transmitting test packets across the communication network 104 (e.g., to the sending client device 108) and having the target device send the packets back. Upon receiving the test packets, the message quality inspection module 124 can analyze the transmission time of all packets and number of lost packets, if any, to determine if there are any QoS issues with the network 104. It is thus one aspect of the present invention to provide a message quality inspection module 124 capable of providing near real-time message monitoring and caller feedback capabilities based on the understandability of the message that is being left by the caller. As can be appreciated by one skilled in the art, any type of known RTCP module may also be used to analyze the quality of a message as it is being left.

By interrupting a calling party and notifying them that they are leaving a low quality message, the calling party is allowed to try and remedy any situation that may be adding to the message's low quality (e.g., not speaking loud enough, removing background noise, etc.) without waiting until the entire message has been left. Likewise, the voicemail system 116 may be allowed to try and remedy any other factors that may be leading to the low quality voice or video message before the calling party attempts to leave the message again. For example, if the message quality inspection module 124 determines that there may be issues with the server to which the calling party is connected (e.g., the first voicemail server 120a), then the message quality inspection module 124 may cause the calling party to be connected to another voicemail server (e.g., the second voicemail server 120b).

Analogously, if the voicemail server 120 is embodied as a local message machine that uses tape for storing the recording, the message quality inspection module 124 may cause the message to be recorded to the other side of the tape based on the assumption that the first side of the tape is worn out and causing the low quality voice or video message.

Furthermore, if the message quality inspection module 124 determines that it may be network 104 issues that are leading to the sub-standard quality of the message, then the message quality inspection module 124 may cause an alternative network 104 routing to be implemented between the sending client device 108 and the voicemail server 120. For example, the message quality inspection module 124 may determine that a particular node in the network 104 should not be used as a routing node or may positively identify a network 104 node that should be used as a routing node. Examples of routing nodes that may be positively or negatively identified by the message quality inspection module 124 include, without limitation, proxy servers, gateways, routers, switches, and the like. Another option that the message quality inspection module 124 may provide to the calling party if either the network 104 or voicemail server 120 is failing is the option to call back and leave a message at a later time.

Figure 2:
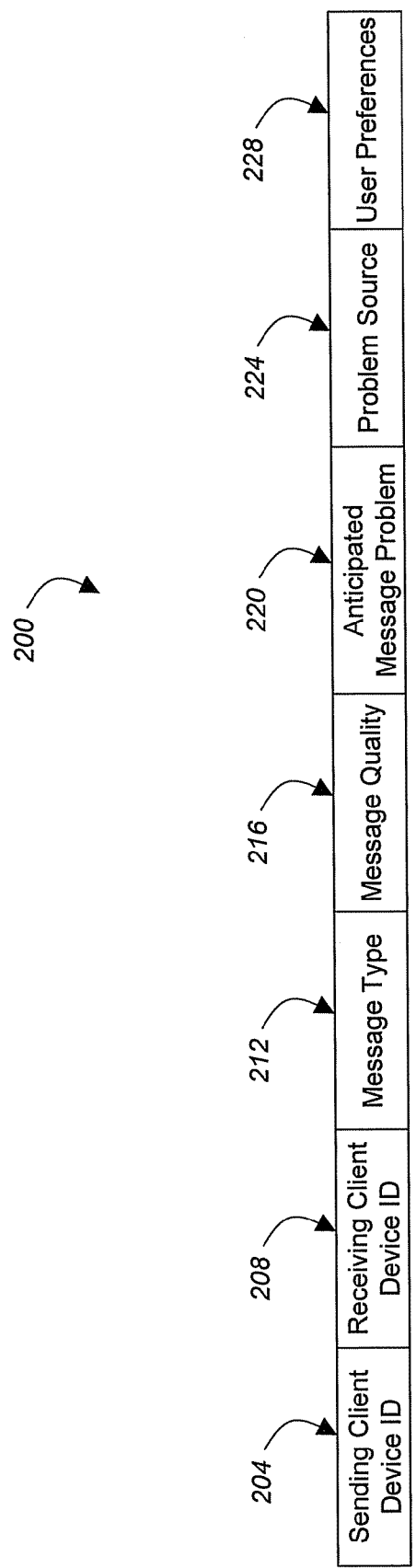
FIG. 2 is a diagram of a data structure employed in accordance with embodiments of the present invention.

Referring now to FIG. 2, a data structure 200 used to store message quality information will be described in accordance with at least some embodiments of the present invention. The data structure 200 may comprise a sending client device ID field 204, a receiving client device ID field 208, a message type field 212, a message quality field 216, an anticipated message problem field 220, a problem source field 224, and a user preferences field 228.

The sending client device ID field 204 may comprise identification data for the sending client device 108. Similarly, the receiving client device ID field 208 may comprise identification data for the receiving client device 112. The identification information in these ID fields 204, 208 may include phone numbers, extensions, addresses, user names, or any other collection of data used to identify and possibly connect with the client device 108, 112. The message quality inspection module 124 may use the information in the sending client device ID field 204 to forward an interruption to the sending client device 108 when a calling party is leaving a low quality message for the intended recipient associated with the receiving client device 112. Likewise, the voicemail server 120 may use data in the receiving client device ID field 208 to determine where a message notification should be sent.

The message type field 212 may contain data that identifies the type of message that is stored or being left on the voicemail server 120. For example, if the calling party is leaving or has left a voice message, then an indication of voice will be maintained in the message type field 212. As another example, if the calling party is leaving or has left a video message, then an indication of video will be maintained in the message type field 212.

The message quality field 216 may be used to maintain data related to the message quality inspection module's 124 determination of the message quality. A qualitative assessment of the message quality may be maintained in the message quality field 216. Examples of such a qualitative assessment may include, for example, high quality, low quality, or acceptable quality. These qualitative assessments may be based on quantitative values that can include the signal-to-noise ratio of the message, the QoS of the network 104, and the quality of the translation of the message. The quantitative values may be compared collectively or separately to qualitative thresholds to determine the qualitative assessment for the message. As an example, if the signal-to-noise ratio of the message exceeds a predetermined threshold such that it would be considered low quality but the translation of the message to text results in a message that would be considered high quality, then the overall qualitative assessment of the message may be considered acceptable. However, if two or more of the quantitative assessments exceed a predetermined quality threshold, then the message may be considered to have a low quality. Alternatively, each of the quantitative values associated with the quality of the message may be maintained in the message quality field 216.

The message quality inspection module 124 may also be adapted to posit as to the source or cause of the poor message quality. Such estimates may be maintained in the anticipated message problem field 220. The data maintained in the anticipated message problem field 220 may be based on the quantitative values determined for the message. Examples of entries that may populate the anticipated message problem field 220 include, without limitation, network problems, server problems, tape problems, caller problems. Each possible message quality problem may have one or more possible sources mapped thereto. Examples of sources may include, but are not limited to, failed network node, busy network, failed server, busy server, background noise, voice signal low, etc. Each source mapped to an identified problem may be maintained in the problem source field 224. The possible source maintained in the problem source field 224 of the may also be provided to the calling party as a part of the low message quality notification. This helps the calling party identify the source of the message quality problem and may help create a better message during subsequent attempts.

The user preferences field 228 may be used to store data related to either the intended recipient's or calling party's preferences for operation of the message quality inspection module 124. As noted above, the default settings of the message quality inspection module 124 may indicate that all voice portions of all messages be analyzed for quality issues. This default setting may be altered to indicate that only voice messages be monitored by quality issues by the intended recipient. Alternatively, the calling party may be asked if they would like to have the message monitored for quality issues and their response may be maintained in the user preferences field 228 either in substitution of or in addition to the default settings and the recipient's preferences.

Figure 3:
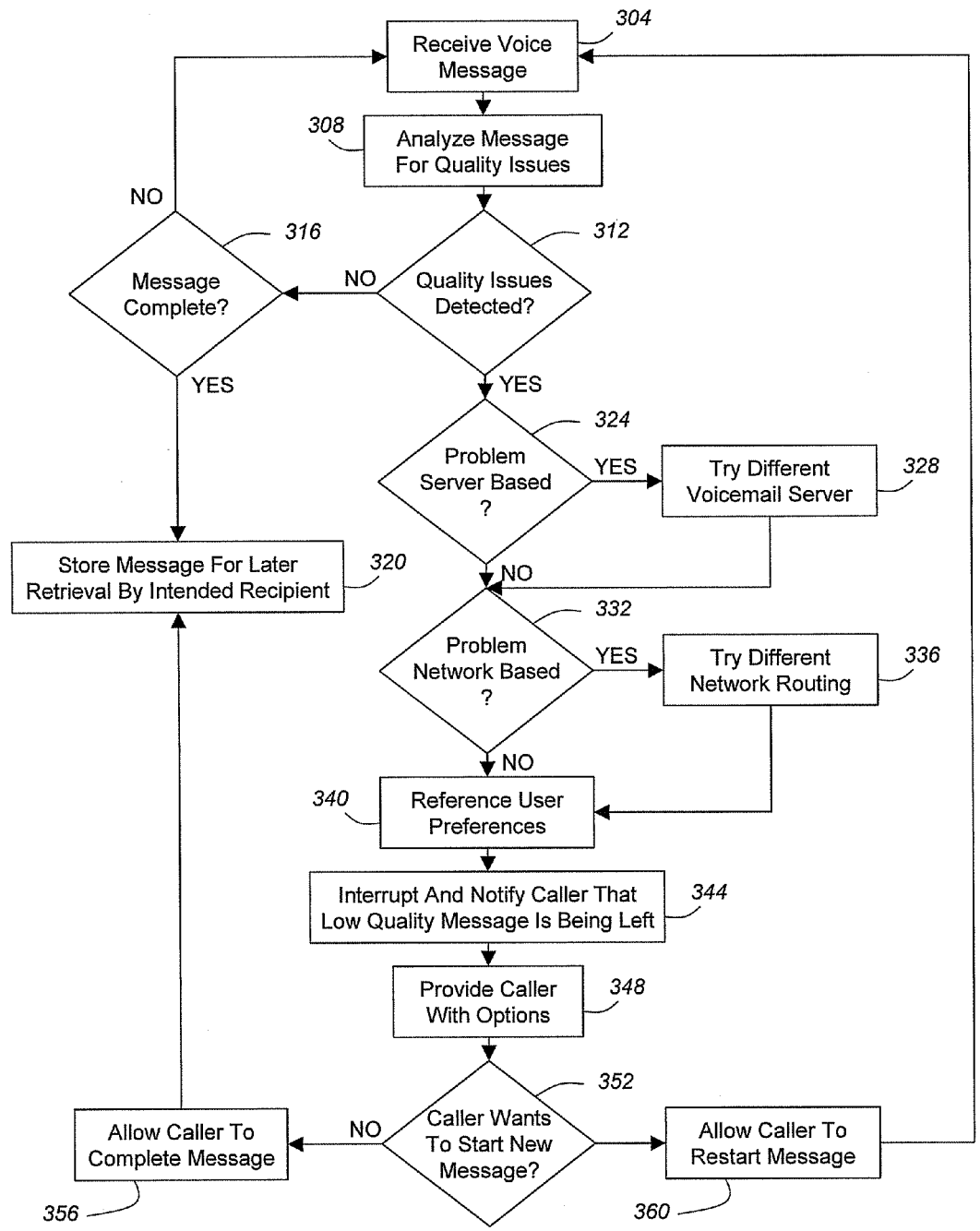
FIG. 3 is a flow diagram depicting a message quality monitoring method in accordance with embodiments of the present invention.

With reference to FIG. 3, a method of analyzing voice portions of a message for quality issues will be described in accordance with at least some embodiments of the present invention. The method begins when a calling party begins to record a message at the voicemail server 120 (step 304). As noted above, the message may comprise a voice message or a video message that contains a voice portion. As the voicemail server 120 receives the message, the voice portion of the message is analyzed for quality issues (step 308). The message quality inspection module 124 may analyze various aspects of the message and conditions about the network 104 as the message is being left. For instance, the message quality inspection module 124 may analyze the signal-to-noise ratio of the message as well as the clarity and accuracy of a text-based version of the message. The message quality inspection module 124 may also analyze the QoS parameters associated with the network 104 while the message is being recorded to determine if packets are being lost in the message. Furthermore, the message quality inspection module 124 may analyze the operating condition of the voicemail server 120 receiving the message.

While the message quality inspection module 124 analyzes the message for quality issues it determines if any quality issues have been detected (step 312). The message quality inspection module 124 may utilize any known type of quality assessment measures to determine if the voice or video message comprises a low quality. The message quality inspection module 124 may determine that a quality issue is occurring if a predetermined threshold has been exceeded that defines acceptable limits of some analyzed parameter (e.g., signal-to-noise ratio, clarity of transcription, accuracy of transcription, packet loss, jitter, etc.). If one or more of the possible thresholds are not exceeded or otherwise violated, then the message quality inspection module 124 allows the caller to continue leaving the message. To this end, the message quality inspection module 124 determines if the caller is done leaving the message and the message has been completed without detecting any quality issues (step 316). If the message is complete, then the message is stored by the voicemail server 120 for later retrieval by the intended recipient (step 320). If the message is not complete, then the method returns to step 304 where the caller is allowed to continue leaving the message.

Referring back to step 312, if the message quality inspection module 124 detects a quality issue with some aspect of the message, meaning that some quality threshold has been violated, then the message quality inspection module 124 continues by trying to diagnose the quality problem as well as its potential source. To accomplish this task, the message quality inspection module 124 determines whether the message quality problem is server based (step 324). This may be determined affirmatively if some monitored aspect of the server 120 (e.g., the server 120 is at processing capacity, the server 120 is failing, the server 120 memory is full, etc.) is determined to have exceeded a predetermined quality threshold. In the event that the message quality inspection module 124 determines that the message quality problem may be server based, then the message quality inspection module 124 may cause the sending client device 108 to be connected to a different voicemail server, such as the second voicemail server 120*b* (step 328).

After the sending client device 108 has been connected to a backup server or if the problem was not server based, then the message quality inspection module 124 continues by determining if the problem is network based (step 332). A network based problem may be identified by determining that some network 104 parameter has violated a predetermined quality threshold. For example, the number of lost packets, jitter, or delay in the message may exceed a predefined threshold of lost packets, jitter, or delay respectively. As another example, the message quality inspection module 124 may detect a network 104 outage or failure of some node within the network 104 by sending test packets across the network 104. If such a failure is detected, then the problem may be considered network based. In the event that the message quality inspection module 124 determines that the message quality problem is network based, then the message quality inspection module 124 may try to effect a different network routing between the sending client device 108 and the voicemail server 120 (step 336). If such a solution is not possible, then the message quality inspection module 124 may inform the calling party that the network 104 is experiencing problems and one option would be to call back later to leave the message or leave a message by a different communication media (e.g., channel).

After the network 104 routing has been adjusted or the quality problem is not network based, the message quality inspection module 124 references the user preferences to determine whether the calling party wants to be interrupted with a quality alert (step 340). As can be appreciated by one skilled in the art, this particular step may be performed far earlier in the method, for example, before the message is received the calling party may be provided with the option of whether they want the message inspected for quality issues. Additionally, the user preferences may be default settings based on the intended recipient's preferences in which case they may also be referenced before any analysis of the message occurs. Regardless of the point when the user preferences are referenced, the message quality inspection module 124 will determine whether it will analyze the quality of a message and interrupt a calling party if the message quality is below a particular standard.

After the user preferences have been referenced and it is determined that the calling party should be notified of the quality issues associated with the message, the message quality inspection module 124 interrupts the calling party as they are leaving the message and notifies them that a low quality message is being recorded (step 344). This interruption and notification may be carried out by providing a message (e.g., voice, text, or the like) to the calling party while they are leaving a message. The message provided to the calling party may be provided as a part of a whisper page that politely transmits the message via a secondary audio connection between the message quality inspection module 124 and the sending client device 108. Alternatively, the message quality inspection module 124 may join the connection between the sending client device 108 and the voicemail server 120 and transmit the message as if it were a participant in the conference. The message quality inspection module 124 may also interrupt the connection between the sending client device 108 and the voicemail server 120 and provide the message to the calling party.

Caller options and suggestions to increase message quality may be provided to the calling party in the message sent during the interruption and notification step (step 348). Examples of options that may be provided to the calling party in the step include, for example, the option to delete the poor quality message, the option to hang-up and try later, the option to continue with leaving the existing poor quality message, the option to leave a new message, and/or the option to connect to another voicemail server 120 or system 116. Suggestions provided to the calling party may be based upon the probably source of the quality problem. The message quality inspection module 124 may reference the problem source field 224 in the data structure 200 to provide such suggestions. Examples of suggestions that may be provided to the calling party include, without limitation, hang-up and try again, remove background noise, speak louder, speak slower or faster, and/or try different client device.

A response may then be received from the calling party based on the options and suggestions provided to the calling party. Based on the response it is determined whether the calling party wants to start a new message or finish leaving the current message (step 352). The calling party's preference for starting a new message versus continuing the same message may depend upon the importance of the message as well as the amount of message that the calling party has to leave. If it is determined that the calling party desires to continue leaving the same message, then the calling party is allowed to finish leaving the same message without further interruptions from the message quality inspection module 124 (step 356). The message is then stored for later retrieval by the intended recipient (step 320).

On the other hand, if it is determined that the calling party desires to start a new message, then the calling party is allowed to restart the message (step 360). In this step, the previous message may be deleted from the voicemail server 120 and the calling party may replace that message with a new message. This step may be performed immediately after receiving an indication from the calling party that they want to leave a new message. Alternatively, this step may be performed after the calling party hangs up and calls back at a later time. When the calling party begins to leave the new message, the method returns to step 304 where the new message is received by the voicemail server 120.

While the above-described flowchart has been discussed in relation to a particular sequence of events, it should be appreciated that changes to this sequence can occur without materially effecting the operation of the invention. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

The systems, methods and protocols of this invention can be implemented on a special purpose computer in addition to or in place of the described communication equipment, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a communications device, such as a phone, any comparable means, or the like. In general, any device capable of implementing a state machine that is in turn capable of implementing the methodology illustrated herein can be used to implement the various communication methods, protocols and techniques according to this invention.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and communication arts.

Moreover, the disclosed methods may be readily implemented in software that can be stored on a storage medium, executed on a programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications device or system.

It is therefore apparent that there has been provided, in accordance with the present invention, systems, apparatuses and methods for notifying a caller when they are leaving a low quality voicemail. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

What is claimed is:

1. A method, comprising:
    during a synchronous messaging session, receiving at least a portion of a verbal message from a calling party;
    during the messaging session, analyzing the message for quality issues;
    during the messaging session, detecting at least one quality issue associated with the message;

during the messaging session and while receiving the message, interrupting the calling party as they are leaving the message that has been determined to comprise at least one quality issue;
determining a problem with the message;
mapping the determined problem to at least one possible source of the problem;
providing an indication of the at least one possible source of the problem to the calling party; and
leaving the message as is if the possible source of the problem is beyond the calling party's control, otherwise, allowing the calling party to leave a new message.

2. The method of claim 1, wherein a quality issue is detected in response to determining that a transcription of the message comprises a number of errors in excess of a predetermined error threshold.

3. The method of claim 1, wherein a quality issue is detected in response to determining that a signal-to-noise ratio of the message does not meet a predetermined signal-to-noise ratio threshold.

4. The method of claim 1, wherein a quality issue is detected in response to determining that a network Quality of Service parameter for a network connecting the calling party and the point where the message is recorded does not meet a predetermined Quality of Service threshold.

5. The method of claim 4, wherein the Quality of Service parameter comprises at least one of packet loss, jitter, and packet delay.

6. The method of claim 1, wherein the problem determined for the message comprises at least one of network problems, server problems, tape problems, and calling party problems and wherein the at least one possible source of the problem comprises at least one of a failed network node, a busy network, a failed server, a busy server, background noise, and a low voice signal.

7. The method of claim 1, further comprising:
providing the calling party with an option to continue leaving the message or try leaving a new message.

8. The method of claim 7, further comprising:
receiving an indication that the calling party wants to try and leave a new message;
deleting the low quality message;
allowing the calling party to leave the new message; and
analyzing the new message for quality issues.

9. The method of claim 1, wherein the message comprises at least one of a voice message and a video message comprising a voice portion.

10. A non-transitory tangible computer readable medium comprising processor executable instructions operable to perform the method of claim 1.

11. A communication device, comprising:
memory for storing a verbal message left by a calling party; and
a message quality inspection module operable to analyze the message as it is being stored in memory for quality, interrupt the calling party while the calling party is leaving the message to notify the calling party that the message being recorded comprises a low quality, determine a problem with the message, map the determined problem to at least one possible source of the problem, provide an indication of the at least one possible source of the problem to the calling party, and leave the message as is if the possible source of the problem is beyond the calling party's control, otherwise allow the calling party to leave a new message.

12. The device of claim 11, wherein the message quality inspection module is operable to determine that the message comprises a low quality by determining that a signal-to-noise ratio of the message does not meet a predetermined signal-to-noise ratio threshold.

13. The device of claim 11, wherein the message quality inspection module is operable to determine that the message comprises a low quality by determining that a transcription of the message comprises a number of errors in excess of a predetermined error threshold.

14. The device of claim 11, wherein the message quality inspection module is operable to determine that the message comprises a low quality by determining that a network Quality of Service parameter for a network connecting the calling party and the point where the message is recorded does not meet a predetermined Quality of Service threshold.

15. The device of claim 11, wherein the message quality inspection module is operable to interrupt the calling party by at least one of (i) establishing a communication channel with the calling party independent of the memory and transmitting a message to the calling party via the separate communication channel; (ii) joining the connection between the calling party and the memory to provide a message to the calling party; and (iii) disrupting the connection between the calling party and the memory to provide a message to the calling party.

16. A voicemail system, comprising:
a first voicemail server operable to receive a verbal message from a calling party and store the message for later retrieval by an intended recipient; and
a message quality inspection module operable to monitor the quality of the message as the calling party leaves the message, interrupt the calling party to notify the calling party that the message is below a predetermined quality threshold while the calling party is leaving the message, identify a problem with the message, map the identified problem to at least one possible source of the problem, provide an indication of the at least one possible source of the problem to the calling party, and leave the message as is if the possible source of the problem is beyond the calling party's control, otherwise allow the calling party to leave a new message.

17. The system of claim 16, further comprising a second voicemail server, wherein the message quality inspection module is operable to (i) determine that the message quality is below a predetermined quality threshold due to a problem with the first voicemail server and (ii) transfer the calling party from the first voicemail server to the second voicemail server.

18. The system of claim 17, wherein the calling party is allowed to leave the new message on the second voicemail server for the intended recipient.

19. The system of claim 16, wherein the message quality inspection module is operable to interrupt the calling party by at least one of (i) establishing a communication channel with the calling party independent of the first voicemail server and transmitting a message to the calling party via the separate communication channel; (ii) joining the connection between the calling party and the first voicemail server to provide a message to the calling party; and (iii) disrupting the connection between the calling party and the first voicemail server to provide a message to the calling party.

20. The system of claim 16, wherein the problem determined for the message comprises at least one of network problems, server problems, tape problems, and calling party problems and wherein the at least one possible source of the problem comprises at least one of a failed network node, a busy network, a failed server, a busy server, background noise, and a low voice signal.

21. The method of claim 1, further comprising remedying at least one factor that may be leading to the at least one quality issue associated with the message before the calling party attempts to leave the message again.

22. The system of claim 11, wherein the communication device remedies at least one factor that may be leading to the low quality message before the calling party attempts to leave the message again.

* * * * *